United States Patent
Yahagi et al.

(10) Patent No.: US 6,822,801 B2
(45) Date of Patent: Nov. 23, 2004

(54) DEVICE FOR DETERMINING FOCUSED STATE OF TAKING LENS

(75) Inventors: Satoshi Yahagi, Saitama (JP); Masao Wada, Tokyo (JP); Tetsuji Inoue, Tokyo (JP); Ryoji Kumaki, Tokyo (JP); Shinobu Nakamura, Tokyo (JP); Haruo Tominaga, Tokyo (JP); Hiroyuki Horiguchi, Tokyo (JP); Hideaki Sugiura, Tokyo (JP); Masayuki Sugawara, Tokyo (JP)

(73) Assignees: Fuji Photo Optical Co., Ltd., Saitama (JP); Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 10/479,492

(22) PCT Filed: Jun. 3, 2002

(86) PCT No.: PCT/JP02/05439

§ 371 (c)(1),
(2), (4) Date: Dec. 3, 2003

(87) PCT Pub. No.: WO02/099498

PCT Pub. Date: Dec. 12, 2002

(65) Prior Publication Data

US 2004/0165276 A1 Aug. 26, 2004

(30) Foreign Application Priority Data

Jun. 4, 2001 (JP) ........................................ 2001-168246

(51) Int. Cl.[7] ........................ G02B 27/14; G02B 27/10; G02B 15/14; G02B 7/28; G03B 13/00
(52) U.S. Cl. ........................ 359/634; 359/626; 359/698; 396/111; 348/349
(58) Field of Search ........................ 359/626, 629, 359/634, 823, 694–698; 396/89, 111; 348/345, 349, 351, 354, 355

(56) References Cited

U.S. PATENT DOCUMENTS 4,333,716 A   6/1982   Sakane et al. .............. 396/168
5,218,445 A   6/1993   van Roessel ................ 348/349
5,235,375 A   8/1993   Yamana et al. ............. 396/101
6,522,480 B2 * 2/2003   Nakamura ................... 359/698
2001/0036361 A1  11/2001   Suda .......................... 396/111
2002/0140839 A1 * 10/2002   Yahagi ....................... 348/345

FOREIGN PATENT DOCUMENTS

| JP | 55-076312 A | 6/1980 |
|---|---|---|
| JP | 59-33407 A | 2/1984 |
| JP | 59-128506 A | 7/1984 |
| JP | 62-247314 A | 10/1987 |
| JP | 3-175884 A | 7/1991 |
| JP | 3-293610 A | 12/1991 |
| JP | 7-84177 A | 3/1995 |
| JP | 7-60211 B2 | 6/1995 |
| JP | 8-50227 A | 2/1996 |
| JP | 2001-154085 A | 6/2001 |
| JP | 2001-305415 A | 10/2001 |

* cited by examiner

Primary Examiner—Scott J. Sugarman
Assistant Examiner—Jack Dinh
(74) Attorney, Agent, or Firm—Birch, Stewart, Kolasch & Birch, LLP (57) ABSTRACT

A beam splitter (24) for splitting light in a wavelength range of about 500 nm to about 600 nm is arranged in a relay optical system of a taking lens (12). A green light beam reflected from the beam splitter (24) is directed through a relay lens (R3) to a focusing state determination imaging unit (26). The imaging unit (26) comprises three imaging elements (A, B, C) for capturing the directed green light beam to determine the focusing state. Thus, a device for determining the focusing state of the taking lens is provided, in which the green light beam is separated as an object light for determining the focusing state from the object light entering the taking lens (12), so that the focusing state can be determined with high accuracy on the basis of the high-frequency components of the image signal generated by capturing the green light beam by means of the imaging elements (A, B, C) having different optical path lengths.

4 Claims, 6 Drawing Sheets

FIG.6

DEVICE FOR DETERMINING FOCUSED STATE OF TAKING LENS

TECHNICAL FIELD

The present invention relates to a focusing state determination device for a taking lens, and in particular to a focusing state determination device for a taking lens which is applicable to focus determination in autofocus control for a taking lens.

BACKGROUND ART

Japanese Patent Application Publication No. 55-76312 and Japanese Patent Publication No. 7-60211 disclose methods of determining focusing states (front focus, rear focus, and just focus) of a taking lens using a plurality of imaging elements having different optical path lengths. For example, two focusing state determination imaging elements for capturing images of an identical viewing area are arranged with respect to an imaging element for capturing images for video (video imaging element) at a position where the optical path length is longer than that of the video imaging element and at a position where the optical path length is shorter than that of the video imaging element, respectively. Then, high frequency components are extracted from image signals obtained by these focusing state determination imaging elements, focus evaluation values indicating degrees of focus (contrast of images) for image capturing surfaces of the focusing state determination imaging elements are found on the basis of the high frequency components, and the focus evaluation values are compared. Consequently, it is determined, from a relation of magnitude of the focus evaluation values, in which state of front focus, rear focus, and just focus a focusing state on the image capturing surface of the video imaging element is. By applying such a determination method of a focusing state, focus determination for autofocus can be performed, and not only whether or not a focusing state is in just focus but also whether the focusing state is front focus or rear focus can be determined. Thus, there is an advantage that a response speed to focus is high.

Japanese Patent Application Publication No. 59-128506 discloses an optical device which branches a part of light beams passing through a taking lens into linear light receiving device array with an oblong light beam division nirror, which is arranged at a position deviated sideways from the optical axis of the taking lens, and subjects outputs of devices of the linear light receiving device array to comparison operation to thereby determining a focusing state.

In recent years, performance of a taking lens and a camera main body used in a television camera system has been remarkably improved as the high-definition television broadcast is becoming popular, and a situation occurs in which a cameraman insufficiently performs focus adjustment with his/her naked eyes with reference to an image in a view finder only. Thus, necessity for autofocus, which is rarely used in a conventional television camera system, is increasing, and highly accurate focusing state determination for the autofocus is becoming indispensable.

In the case where an optical system for focusing state determination is formed in a camera main body, focusing state determination can only be performed by the camera main body. On the other hand, in the case where an optical system for focusing state determination is formed in the taking lens as in the optical device disclosed in Japanese Patent Application Publication No. 59-128506, there is an advantage that focusing state determination is possible in all camera systems using the taking lens.

However, in the optical device disclosed in Japanese Patent Application Publication No. 59-128506, since light in an entire wavelength range of subject light for video passing through the taking lens is split from the subject light to be used as subject light for focusing state determination, there is a disadvantage that sufficient accuracy cannot be obtained for focusing state determination applicable to the high-definition television broadcast or the like.

The present invention has been devised in view of such circumstances, and it is an object of the present invention to provide a focusing state determination device for a taking lens, which incorporates an optical system for focusing state determination in the taking lens and makes it possible to perform sufficiently highly accurate focusing state determination applicable for the high-definition television broadcast or the like.

SUMMARY OF THE INVENTION

In order to attain the above-described object, a focusing state determination device for a taking lens according to the present invention is characterized by comprising: a plurality of focusing state determination imaging elements which are arranged at positions having optical path lengths with respect to the taking lens different from each other; and a light splitting device which is arranged on an optical path in the taking lens, and splits light of color components in a wavelength range of 500 mm to 600 nm in subject light passing through the taking lens into subject light for video entering an imaging element for video of a camera main body and subject light for focusing state determination incident on the plurality of focusing state determination imaging elements, wherein a focusing state of the taking lens is determined according to high frequency components of image signals obtained by the plurality of focusing state determination imaging elements.

Preferably, the light splitting device is arranged in a relay optical system of the taking lens.

Preferably, the focusing state determination device for the taking lens is applied to focus determination in autofocus control of the taking lens.

According to the present invention, light of color components in the wavelength range of 500 nm to 600 nm, that is, green light is used as subject light for focusing state determination. In general, a luminance signal in a transmitted image indicates brightness and darkness of an image and is generated with mixture of signals of the primary colors such that the green components exist in the largest quantity while taling into account the fact that sensitivity of human eyes for brightness is the highest for green among the three primary colors of red, green and blue. Therefore, by using green light as subject light for focusing state determination as in the present invention, highly accurate focusing state determination more conformable to sensitivity of the eyes becomes possible, and highly accurate focus can be obtained by applying the focusing state determination of the present invention to focus determination in autofocus and the like.

Moreover, by arranging the light splitting device for splitting subject light for focusing state determination from subject light for video in the taking lens, an optical system for the focusing state determination device in accordance with the present invention can be incorporated in the taking lens separately from a camera main body, and focusing state determination becomes possible in all camera systems using the taking lens.

THE PREFERRED EMBODIMENTS FOR CARRYING OUT THE INVENTION

A preferred embodiment of a focusing state determination device for a taking lens in accordance with the present invention will be described with reference to the accompanying drawings.

Figure 1:
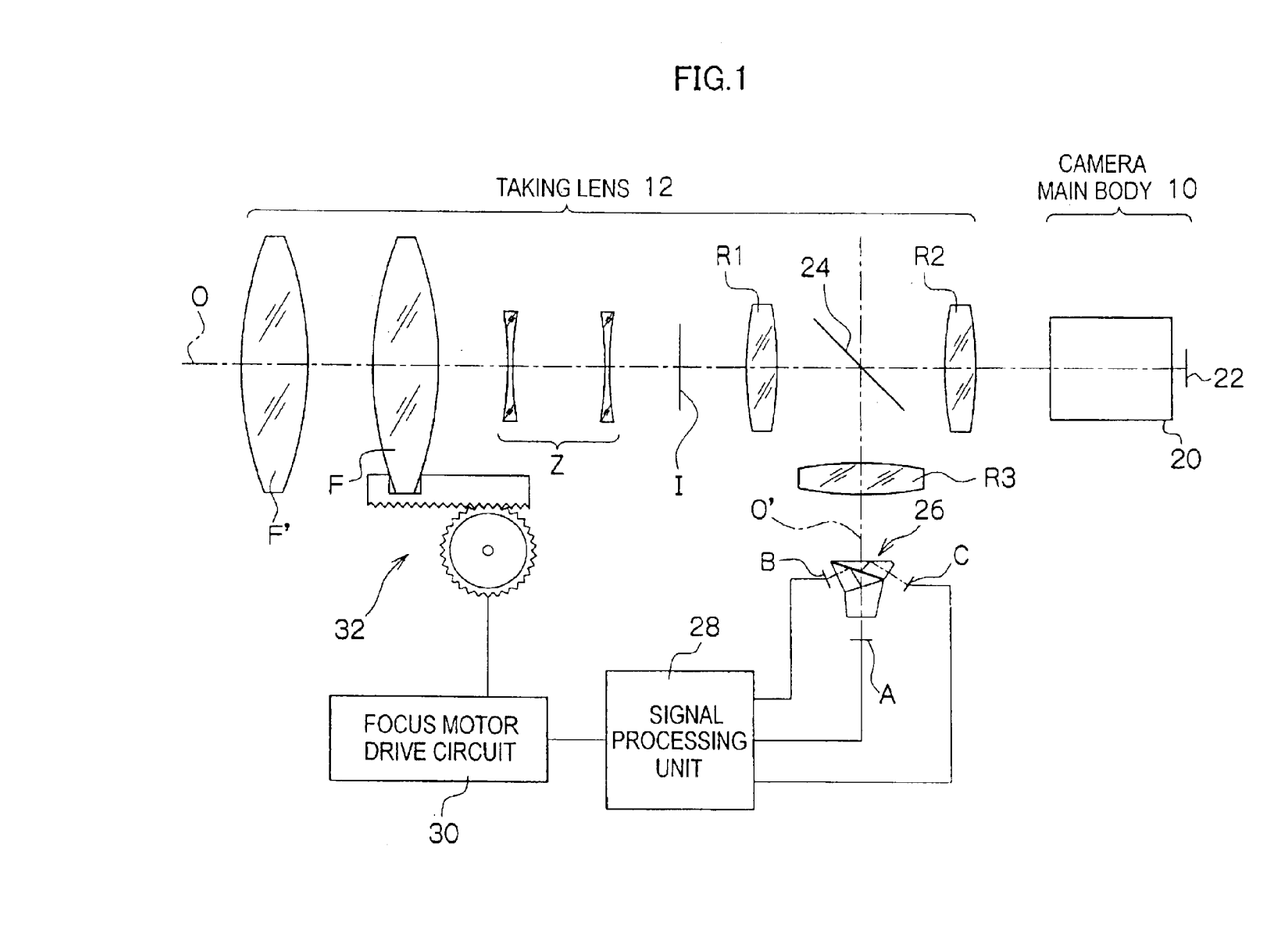
FIG. 1 is a diagram showing a structure of a focusing state determination device in accordance with the present invention which is applied to a taking lens used for a television camera system.

FIG. 1 is a diagram showing a structure of a focusing state determination device in accordance with the present invention which is applied to a taking lens used for, for example, a television camera system. The television camera system shown in the drawing includes a camera main body 10, an interchangeable taking lens 12, and the like. In the camera main body 10, imaging elements for outputting a video signal of a predetermined format or recording the video signal in a recording medium (imaging elements for video), a required circuit, and the like are incorporated. On the other hand, the taking lens 12 is detachably mounted on a front side of the camera main body 10. As shown in the drawing, in an optical system of the taking lens 12, as generally known, there are arranged a fixed focus lens F', a movable focus lens F, a zoom lens Z comprising a magnification system and a correction system, an iris I, a relay lens (relay optical system) comprising a front relay lens R1 and a rear relay lens R2, and the like in this order from the front side. A structure of each lens is simplified in the drawing, and a lens group comprising a plurality of lenses may be represented by one lens.

As shown in the drawing, a semitransparent mirror or a beam splitter 24, which is inclined at an angle of about 45 degrees with respect to an optical axis O of the taking lens 12 and is used for branching subject light (light beams) for focusing state determination from subject light, is arranged on an optical path of the subject light between the front relay lens R1 and the rear relay lens R2 of the relay optical system.

Subject light other than light beams branched by the beam splitter 24 in the subject light incident from the front side of the taking lens 12, that is, subject light for video is emitted from the rear end side of the taking lens 12 and enters an imaging unit 20 of the camera main body 10. Although a structure of the imaging unit 20 will not be described, the subject light entering the imaging unit 20 is resolved into, for example, three colors of red light, green light, and blue light by a color resolution optical system and is incident on an image capturing surface of an imaging element (video imaging element) for each color. Thus, a color video for broadcasting is captured. A focusing surface 22 in the drawing is a position that is optically equivalent to an image capturing surface of each video imaging element represented on the optical axis O of the taking lens 12.

On the other hand, the beam splitter 24, which is arranged between the front relay lens R1 and the rear relay lens R2 of the relay optical system, splits light beams with a wavelength range of approximately 500 nm to approximately 600 nm in the subject light entering the taking lens 12 into transmitted light and reflected light at a predetermined ratio, and transmits substantially 100% of light beams other than those in the wavelength range. Thus, the light beams transmitted through the beam splitter 24 are guided to the camera main body 10 as subject light for video as described above, whereas the green light reflected on the beam splitter 24 is guided as subject light for focusing state determination to a focusing state determination imaging unit 26 along an optical axis O' substantially perpendicular to the optical axis O. Here, the subject light is in a state of substantially parallel light between the front relay lens R1 and the rear relay lens R2, and the green light reflected on the beam splitter 24 passes through a relay lens R3 for condensing light having the same characteristics as the rear relay lens R2 to enter the focusing state determination imaging unit 26.

By using the green light as the subject light for focusing state determination in this way, a focusing state is determined on the basis of a color component with highest sensitivity for human eyes. Thus, focusing state determination with high accuracy becomes possible.

Figure 2:
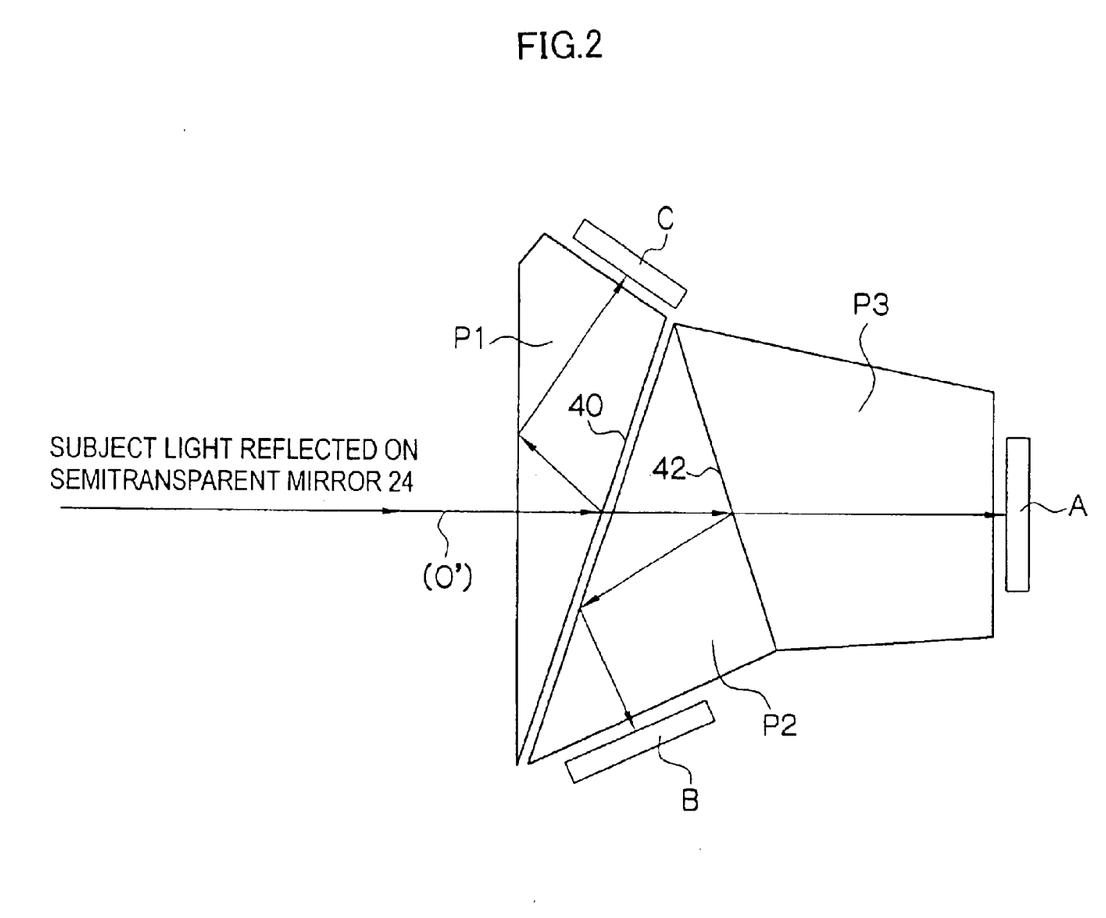
FIG. 2 is a diagram showing a structure of a focusing state determination imaging unit.

FIG. 2 is a diagram showing a structure of the focusing state determination imaging unit 26. As shown in the drawing, the imaging unit 26 includes three prisms P1, P2, and P3 constituting a light division optical system and three focusing state determination imaging elements (two-dimensional CCDs) A, B, and C. As described above, the subject light (green light), which is reflected on the beam splitter 24 and travels along the optical axis O', first enters the first prism P1 and is split into reflected light and transmitted light on a beam splitter surface 40 of the first prism P1. The light reflected on the beam splitter surface 40 is incident on an image capturing surface of the imaging element C. On the other hand, the light transmitted through the beam splitter surface 40 subsequently enters the second prism P2 and is further split into reflected light and transmitted light on a beam splitter surface 42 of the second prism P2. The light reflected on the beam splitter surface 42 is made incident on the imaging element B. On the other hand, the light transmitted through the beam splitter surface 42 passes through the third prism P3 to be incident on the imaging element A. The subject light is split on the beam splitter surface 40 of the first prism P1 and the beam splitter surface 42 of the second prism P2 such that amounts of light incident on the imaging elements A, B, and C are equal to each other. The focusing state determination imaging elements A, B, and C do not need to be imaging elements for capturing color video, and are assumed to be CCDs capturing a black and white image in this embodiment.

Figure 3:
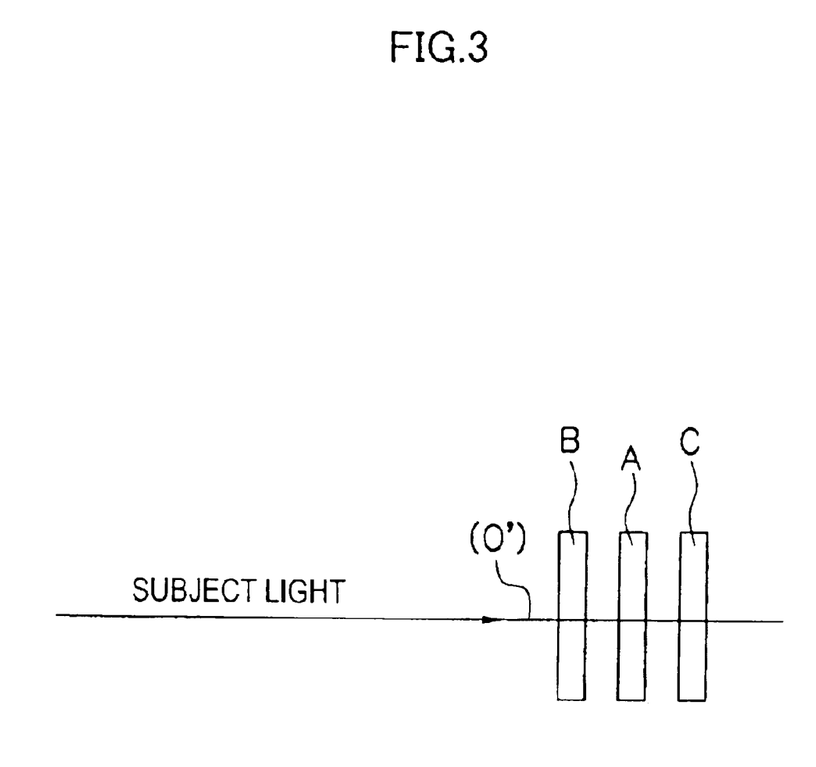
FIG. 3 is a diagram showing focusing state determination imaging elements A, B, and C on an identical optical axis.

When optical axes of the subject light incident on the imaging elements A, B, and C (optical axes of the imaging elements) are represented on an identical straight line, as shown in FIG. 3, with respect to the subject light until it is incident on the imaging elements A, B, and C, the optical path length of the imaging element B is the shortest, the optical path length of the imaging element C is the longest, and the optical path length of the imaging element A has an intermediate length between the optical path lengths of the imaging element B and the imaging element C. In other words, the image capturing surfaces of the imaging element B and the imaging element C are arranged in parallel with each other at equidistant positions in the front and rear with respect to the image capturing surface of the imaging element A. The image capturing surface of the imaging element A is in a conjugate relation with the focusing surface 22 (see FIG. 1) of the camera main body 10, and the optical path length thereof with respect to the subject light entering the taking lens 12 coincides with the image capturing surface of the video imaging element of the camera main body 10. The light division optical system for branching the subject light to the imaging elements A, B, and C is not limited to the structure using the prisms P1 to P3 as described above.

With the optical system constituted as described above, the green light in the subject light entering the taking lens 12 is used for image capturing by the three focusing state determination imaging elements A, B, and C with the different optical path lengths, which are arranged in the vicinity of the position conjugate to the focusing surface 22 of the camera main body 10.

Next, an outline will be described concerning control of autofocus based upon focusing state determination. As shown in FIG. 1, image signals obtained by the three imaging elements A, B, and C of the focusing state determination imaging unit 26 are taken into a signal processing unit 28. As described later, the signal processing unit 28 finds a position of the focus lens F (a just focus position) where a focusing state of the taking lens 12 becomes a just focus state with respect to the focusing surface 22 of the camera main body 10 on the basis of high frequency components of the image signals obtained from the imaging elements A, B, and C. Then, the signal processing unit 28 outputs a control signal instructing movement of the focus lens F to the just focus position to a focus motor drive circuit 30. The focus motor drive circuit 30 drives a not-shown focus motor and moves the focus lens F via a power transmission mechanism 32 comprising a gear and the like to set the focus lens F at the just focus position instructed by the signal processing unit 28. Such processing is continuously performed, whereby the control of autofocus is performed.

Figure 4:
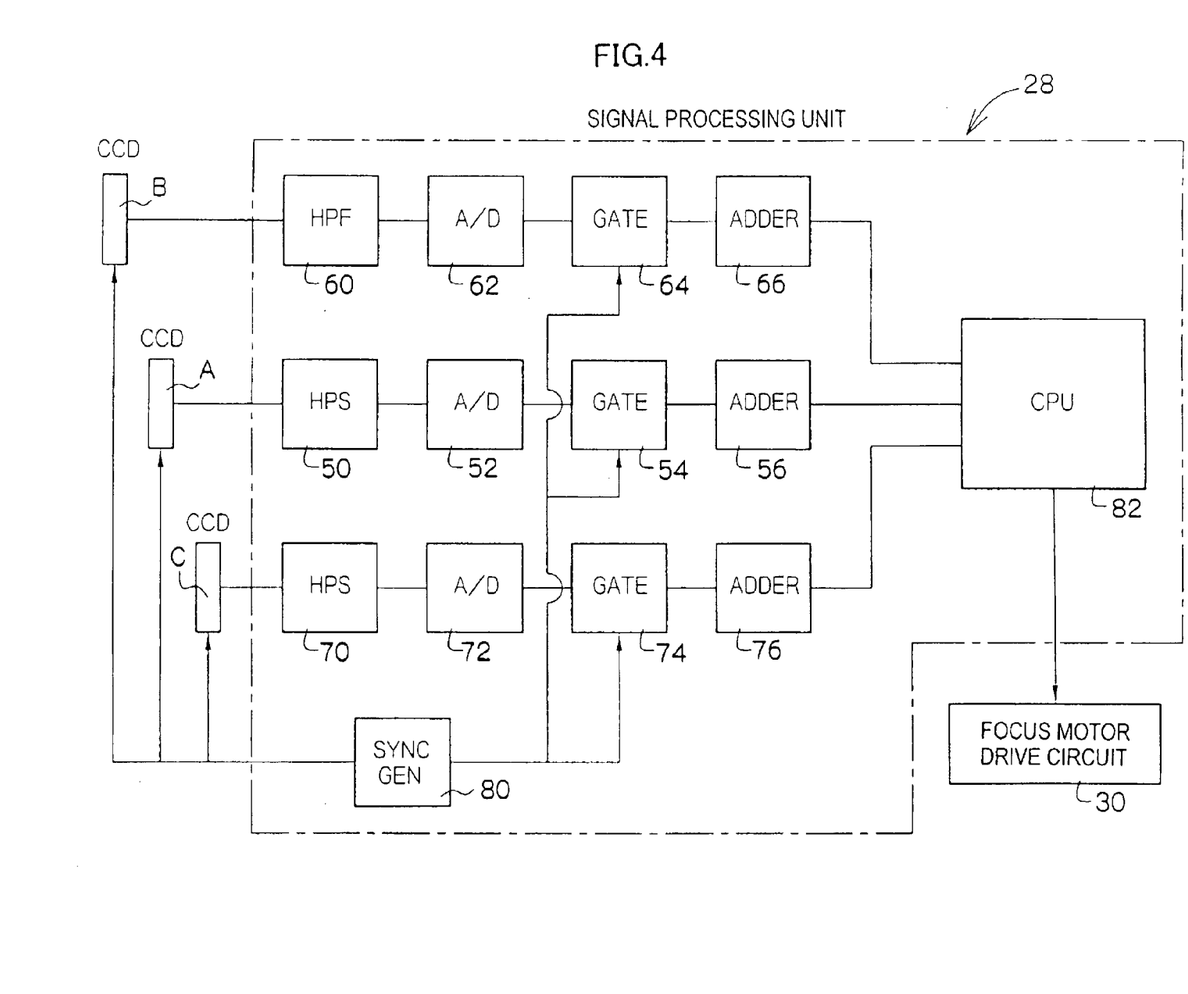
FIG. 4 is a block diagram showing a structure of a signal processing unit which performs processing for focusing state determination.

Subsequently, a structure of the signal processing unit 28 and processing for focusing state determination will be described. FIG. 4 is a block diagram showing the structure of the signal processing unit 28. As shown in the drawing, images of a subject captured by the focusing state determination imaging elements A, B, and C are outputted as video signals of a predetermined format, and are converted into signals of focus evaluation values indicating sharpness of the images (contrast of the images) by high pass filters 50, 60, and 70, A/D converters 52, 62, and 72, gate circuits 54, 64, and 74, and adders 56, 66, and 76, which are constituted in the same manner with respect to the imaging elements A, B, and C, and inputted to a CPU 82. Processing up to finding the focus evaluation value will be described using the circuit which is provided for the imaging element A. Since the imaging element A in this embodiment is the CCD for capturing a black and white image, a video signal outputted from the imaging device A is a luminance signal indicating luminance of each pixel constituting a screen. Then, the video signal is first inputted to the high pass filter (HPF) 50, and high frequency components of the video signal are extracted. Signals of the high frequency components extracted by the HPF 50 are converted into digital signals by the A/D converter 52. Then, only digital signals corresponding to pixels in a predetermined focusing area (e.g., a central part of the screen) among the digital signals for one screen (one field) of the image captured by the imaging element A are extracted by the gate circuit 54, and then values of the digital signals in the extracted range are added up by the adder 56. Consequently, a total sum of values for the high frequency components of the video signals in the focusing area is found. The value obtained by the adder 56 is a focus evaluation value indicating a level of sharpness of the image in the focusing area.

Various synchronizing signals are given to the imaging elements A, B, and C and the circuits such as the gate circuits 54, 64, and 74 from a synchronizing signal generation circuit 80 shown in the drawing, and synchronization of processing of the circuits is realized. A vertical synchronizing signal (V signal) for each field of a video signal is given to the CPU 82 from the synchronizing signal generation circuit 80.

Figure 5:
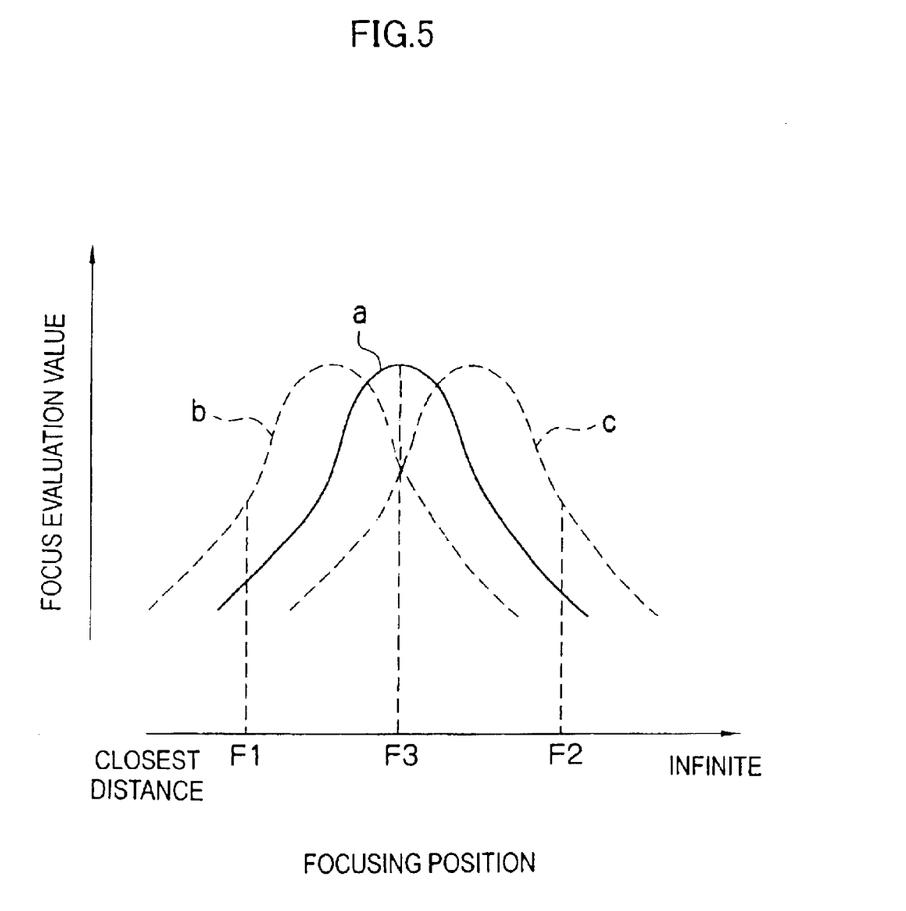
FIG. 5 is a diagram showing a state of a focus evaluation value in each focusing state determination imaging element with respect to a focusing position at the time when a certain subject is shot.

On the basis of the focus evaluation values obtained from the imaging elements A, B, and C as described above, the CPU 82 determines a present focusing state of the taking lens 12 with respect to the focusing surface 22 of the camera main body 10. FIG. 5 is a diagram showing a state of a focus evaluation value with respect to a focusing position at the time when a certain subject is shot, in which a focusing position of the taking lens 12 is taken on the horizontal axis and a focus evaluation value is taken on the vertical axis. A curve "a" indicated by a solid line in the drawing indicates a focus evaluation value obtained from the imaging element A, which is at the position conjugate to the focusing surface 22 of the camera main body 10, with respect to the focusing position. Curves "b" and "c" indicated by dashed lines in the drawing indicate focus evaluation values obtained from the imaging elements B and C, respectively, with respect to the focusing position.

In the drawing, a focusing position F3 where the focus evaluation value of the curve "a" becomes the largest (maximum) is the just focus position. Here, it is assumed that a focusing position of the taking lens 12 is set at a position of F1 in the drawing. In this case, focus evaluation values obtained from the imaging elements A, B, and C are values corresponding to the focusing position F1 according to the curves "a", "b", and "c". In this case, since at least the focus evaluation value obtained from the imaging element B is larger than the focus evaluation value obtained from the imaging element C, it is seen that this is a state in which the focusing position is set further on a closest distance side than the focusing position F3, which is the just focus position, that is, a front focus state.

On the other hand, when it is assumed that the focusing position of the taking lens 12 is set at a position of P2 in the drawing, focus evaluation values obtained from the imaging elements A, B, and C are values corresponding to the focusing position F2 according to the curves "a", "b", and "c". In this case, since at least the focus evaluation value obtained from the imaging element C is larger than the focus evaluation value obtained from the imaging element B, it is seen that this is a state in which the focusing position is set further on an infinite side than the focusing position F3, which is the just focus position, that is, a rear focus state.

When it is assumed that the focusing position of the taking lens 12 is set at the just focus position of F3 in the drawing, focus evaluation values obtained from the imaging elements A, B, and C are values corresponding to the focusing position F3 according to the curves "a", "b", and "c". In this case, since the focus evaluation value obtained from the imaging element B and the focus evaluation value obtained from the imaging element C are equal to each other, it is seen that this is a state in which the focusing position is set in the focusing position F3, that is, a just focus state.

In this way, on the basis of the focus evaluation values obtained from the imaging elements A, B, and C, it can be determined which of the front focus, the rear focus, and the just focus a focusing state at a present focusing position of the taking lens 12 is. On the other hand, in such a judgment method of a focusing state, only the focus evaluation values obtained from the imaging elements B and C are sufficient, and the focus evaluation value obtained from the imaging element A is unnecessary. Hence, in this embodiment, the focus evaluation values obtained from the three imaging elements A, B, and C are effectively utilized to directly determine a focusing position where the just focus is realized as follows.

In the above-described FIG. 5, since the curves "a", "b", and "c"for the focus evaluation values obtained from the imaging elements A, B, and C have substantially identical shapes, focus evaluation values obtained from the imaging elements B and C at a certain focusing position can be regarded as a focus evaluation value of the imaging element A at a focusing position displaced by a predetermined shift amount from the certain focusing position. For example, in a curve "a" of a focus evaluation value of the imaging element A shown in FIG. 6, it is assumed that a focusing position is set at F4 in the drawing. In this case, a focus evaluation value obtained from the imaging element A indicates a value of point PA on the curve "a". On the other hand, a focus evaluation value obtained from the imaging element B indicates a value of point PB on the curve "a" at a focusing position F5, which is displaced by a predetermined shift amount further to an infinite side than the focusing position F4. A focus evaluation value obtained from the imaging element C indicates a value of point $P_C$ on the curve "a" at a focusing position F6, which is displaced by a predetermined shift amount further to a closest distance side than the focusing position F4. A difference between the focusing position F4 and the focusing position F5, that is, a shift amount for the focus evaluation value obtained from the imaging element B is, for example, in FIG. 5, equal to a difference between a focusing position of a maximum point of the curve "b" and a focusing position of a maximum point of the curve "a". A difference between the focusing position F4 and the focusing position F6, that is, a shift amount for the focus evaluation value obtained from the imaging element C is, in FIG. 5, equal to a difference between a focusing position of a maximum point of the curve "c" and the focusing position of the maximum point of the curve "a".

Figure 6:
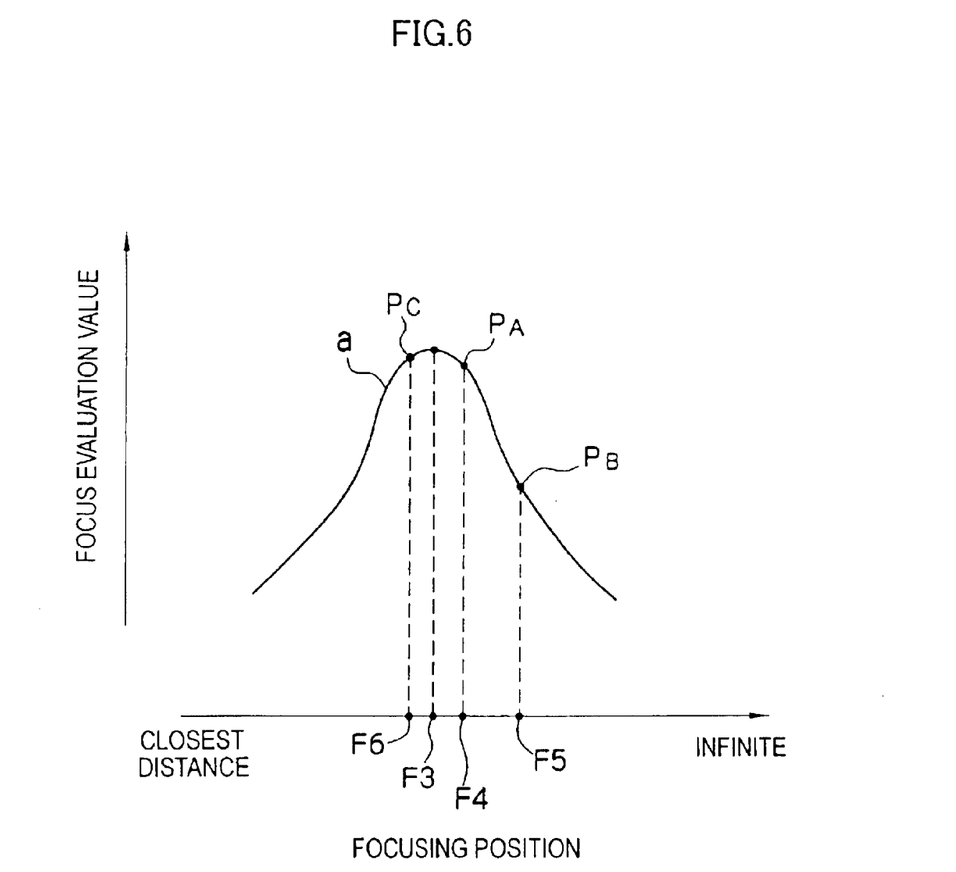
FIG. 6 is an explanatory diagram which is used for explanation of processing for focusing state determination by three focusing state determination imaging elements.

On the other hand, the curve "a" can be approximated by a predetermined function (e.g., a quadratic curve). Therefore, the curve "a" can be specified from the focus evaluation values in the three points $P_A$, $P_B$, and $P_C$ obtained from the imaging elements A, B, and C, and the just focus position F3 can be found, where the focus evaluation value becomes the maximum on the curve "a".

In this way, upon determining the focusing position where the just focus is realized on the basis of the focus evaluation values obtained from the imaging elements A, B, and C, the CPU 82 of FIG. 1 sends a control signal to the focus motor drive circuit 30 to move the focus lens F so as to be at the just focus position. Consequently, control of autofocus is performed.

In the above-described embodiment, the imaging element B and the imaging element C are arranged at positions in the front and rear where the image capturing surfaces become optically equidistant with respect to the focusing state determination imaging element A, which is arranged at the position conjugate to the focusing surface 22 of the camera main body 10. However, it is sufficient that the imaging elements A, B, and C are arranged such that the optical path lengths thereof are different, and at least one of the imaging elements A, B, and C is arranged at each of a position where the optical path length is longer than the position conjugate to the focusing surface 22 of the camera main body 10 and a position where the optical path length is shorter that the position conjugate to the focusing surface 22 of the camera main body 10. That is, as described above, in the case where focus evaluation values obtained from the imaging elements B and C at a certain focusing position are regarded as a focus evaluation value of the imaging element A at a focusing position displaced by predetermined shift amounts from the certain focusing position, it is sufficient to set the shift amounts on the basis of distances from the imaging elements B and C to the imaging element A. As a method of finding the shift amounts, for example, a focusing position is changed while a fixed subject is shot, and focusing positions where focus evaluation values obtained from the imaging elements A, B, and C become the maximum are found. Then, the displacement amounts of the focusing positions where the focus evaluation values obtained from the imaging elements B and C become the maximum are determined with respect to the focusing position where the focus evaluation value obtained from the imaging element A becomes the maximum, and the displacement amounts are set as the above-described shift amounts.

In the above-described embodiment, the image capturing surface of the focusing state determination imaging element A is arranged at the position conjugate to the focusing surface 22 of the camera main body 10. However, this is not always necessary. In other words, in the same manner as the above-described method of determining displacement amounts of the focusing positions where the focus evaluation values obtained from the imaging elements B and C become the maximum with respect to the focusing position where the focus evaluation value obtained from the imaging element A becomes the maximum, a displacement amount of a focusing position where the focus evaluation value obtained from the imaging element A becomes the maximum is determined with respect to a just focus position where the just focus is realized on the focusing surface 22 of the camera main body 10, and the displacement amount is set as a shift amount for the focus evaluation amount obtained from the imaging element A. That is, the focus evaluation value obtained from the imaging element A is regarded as a focus evaluation value at a focusing position displaced from an actual focusing position by the shift amount. Shift amounts of the focus evaluation values obtained from the imaging element B and C are determined in the same manner. Consequently, a curve of a focus evaluation value for the focusing surface 22 of the camera main body 10 can be found on the basis of focus evaluation values of the imaging elements A, B, and C obtained at a certain focusing position, and the focusing position where the just focus is obtained can be found according to the curve.

In the above-described embodiment, the three focusing state determination imaging elements A, B, and C are arranged in the imaging unit 26. However, it is also possible to arrange only the two focusing state determination imaging element B and C in front and rear of the position conjugate to the focusing surface 22 of the camera main body 10 to thereby determine which of the front focus state, the rear focus state, and the just focus state a focusing state is, and perform autofocus on the basis of a result of the determination. Conversely, it is also possible to use four or more focusing state determination imaging elements having different optical path lengths and arrange at least one imaging element at each of a position where the optical path length is longer than the position conjugate to the focusing surface 22 of the camera main body 10 and a position where the optical path length is shorter than the position conjugate to the focusing surface 22 of the camera main body 10 such that a just focus position can be determined more accurately.

In the above-described embodiment, the case where determination of a focusing state by the focusing state determination device according to the present invention is applied to autofocus is described. However, the present invention is not limited to this but may be used for other applications, for example, display of a focusing state and the like.

In the above-described embodiment, the beam splitter 24, which splits the green light for focusing state determination from the subject light entering the taking lens 12, is arranged between the front relay lens R1 and the rear relay lens R2 of the relay optical system. However, the beam splitter 24 may be arranged in front of the front relay lens R1 or may be arranged behind the rear relay lens R2.

In the above-described embodiment, the green light in the wavelength range of approximately 500 nm to approximately 600 nm is split as the subject light for focusing state determination by the beam splitter 24. However, the present invention is not limited to the case where light beams in the entire wavelength range of approximately 500 nm to approximately 600 nm are split, and only light beams in a part of this wavelength range may be split as the subject light for focusing state determination.

In the above-described embodiment, the optical system for focusing state determination, that is, the beam splitter 24, the relay lens R3, and the imaging unit 26 (see FIG. 1) may be undetachably incorporated in the taking lens 12 or may be detachably incorporated therein.

INDUSTRIAL APPLICABILITY

As described above, according to the focusing state determination device for a taking lens in accordance with the present invention, light of color components in a wavelength range of 500 nm to 600 nm, that is, green light is used as subject light for focusing state determination. In general, a luminance signal in a transmitted image indicates contrast of an image and is generated with mixture of signals of the primary colors such that the green components exist in the largest quantity while taking into account the fact that sensitivity of human eyes for brightness is the highest for green among the three primary colors of red, green and blue. Therefore, by using green light as subject light for focusing state determination as in the present invention, highly accurate focusing state determination more conformable to sensitivity of the eyes becomes possible, and highly accurate focus can be obtained by applying the focusing state determination of the present invention to focus determination in autofocus and the like.

Moreover, by arranging a light splitting device for splitting subject light for focusing state determination from subject light for video in a taking lens, an optical system for the focusing state determination device in accordance with the present invention can be incorporated in the taking lens separately from a camera main body, and focusing state determination becomes possible in all camera systems using the taking lens.

What is claimed is:

1. A focusing state determination device for a taking lens, comprising:

a plurality of focusing state determination imaging elements which are arranged at positions having optical path lengths with respect to the taking lens different from each other, the taking lens being interchangeably connectable to a camera main body; and a light splitting device which is arranged on an optical path in the taking lens, and splits light of color components in a wavelength range of 500 nm to 600 nm in subject light passing through the taking lens before entering a color resolution optical system in the camera main body at a side of the taking lens into subject light for video entering an imaging element for video in the camera main body and subject light for focusing state determination incident on the plurality of focusing state determination imaging elements, wherein a focusing state of the taking lens is determined according to high frequency components of image signals obtained by the plurality of focusing state determination imaging elements.

2. The focusing state determination device for the taking lens as defined in claim 1, wherein the focusing state determination device for the taking lens is applied to focus determination in autofocus control of the taking lens.

3. The focusing state determination device for the taking lens as defined in claim 1, wherein the light splitting device is arranged in a relay optical system of the taking lens.

4. The focusing state determination device for the taking lens as defined in claim 3, wherein the focusing state determination device for the taking lens is applied to focus determination in autofocus control of the taking lens.

* * * * *